(12) United States Patent
Walter et al.

(10) Patent No.: US 7,593,393 B2
(45) Date of Patent: Sep. 22, 2009

(54) VOICE OVER INTERNET PROTOCOL MULTI-ROUTING WITH PACKET INTERLEAVING

(75) Inventors: Edward Walter, Boeme, TX (US); Michael Raftelis, San Antonio, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 568 days.

(21) Appl. No.: 11/336,199

(22) Filed: Jan. 20, 2006

(65) Prior Publication Data

US 2007/0171890 A1 Jul. 26, 2007

(51) Int. Cl.
*H04L 12/66* (2006.01)
(52) U.S. Cl. .................. 370/352; 370/473; 370/355; 370/356
(58) Field of Classification Search .......... 455/351, 455/352, 394, 395.1, 355, 356, 473, 395.5, 455/389, 401, 230, 328, 392
See application file for complete search history.

(56) References Cited

U.S. PATENT DOCUMENTS

| | | | |
|---|---|---|---|
| 4,807,224 A | 2/1989 | Naron et al. | |
| 5,450,410 A | 9/1995 | Hluchyj et al. | |
| 5,678,007 A | 10/1997 | Hurvig | |
| 5,754,754 A * | 5/1998 | Dudley et al. | 714/18 |
| 6,377,573 B1 | 4/2002 | Shaffer et al. | |
| 6,778,496 B1 | 8/2004 | Meempat et al. | |
| 6,831,898 B1 | 12/2004 | Edsall et al. | |
| 6,839,865 B2 | 1/2005 | Gould et al. | |
| 6,928,294 B2 * | 8/2005 | Maggenti et al. | 455/518 |
| 6,947,379 B1 | 9/2005 | Gleichauf et al. | |
| 6,956,820 B2 | 10/2005 | Zhu et al. | |
| 7,099,327 B1 * | 8/2006 | Nagarajan et al. | 370/394 |
| 7,406,082 B2 * | 7/2008 | Nagarajan et al. | 370/394 |
| 2003/0012178 A1 | 1/2003 | Mussman et al. | |
| 2003/0202505 A1 * | 10/2003 | Ozugur | 370/352 |
| 2003/0210681 A1 | 11/2003 | Sumi et al. | |
| 2005/0147110 A1 | 7/2005 | Connor | |
| 2005/0180327 A1 * | 8/2005 | Banerjee et al. | 370/236 |
| 2006/0072495 A1 * | 4/2006 | Mundra et al. | 370/328 |
| 2007/0076690 A1 * | 4/2007 | Dyck et al. | 370/352 |

* cited by examiner

*Primary Examiner*—Cong Van Tran
(74) *Attorney, Agent, or Firm*—Brinks Hofer Gilson & Lione

(57) ABSTRACT

A method and system for processing data packets is described within. The method executed by the system includes the steps of receiving a first data packet, determining if the first data packet is a first expected data packet, determining if the first data packet is a next expected date packet, storing the first data patent if the first data packet is the next expected data packet and waiting a period of time for a second data packet.

26 Claims, 3 Drawing Sheets

VOICE OVER INTERNET PROTOCOL MULTI-ROUTING WITH PACKET INTERLEAVING

TECHNICAL FIELD

The present disclosure generally relates to methods and systems for processing Internet protocol data packets.

BACKGROUND

There is growing demand for Internet based services such as voice over Internet protocol (VoIP) telephone calls and Internet based teleconferencing. Internet services such as these require large amounts of available bandwidth for transferring information between locations. As the amount of data transferred increases, the amount of available bandwidth must also be increased.

Internet based services that require data to be transferred in a timely fashion and in a specific sequence are particularly vulnerable to decreased amounts of bandwidth. For example, when downloading a file to be opened by a word processor, the receiving computer will collect all the data packets that comprise the file and reassemble them. The order in which these data packets arrive is of no consequence because the receiving computer will reassemble them before the user opens the file. However, when using Internet services such as VoIP, packets should be delivered in a timely fashion and in sequence so that a telephone conversation is possible. If data packets for a VoIP telephone call are not delivered in timely fashion and in sequence, the telephone call may experience deficiencies such as echoing, latency and jitter.

Therefore, there is a need for a system that will provide for increased availability of data packets for a VoIP telephone call or other high bandwidth Internet services.

DETAILED DESCRIPTION

A method and system for processing data packets is described below. The method executed by the system may include the steps of receiving a first data packet, determining if the first data packet is a first expected data packet, determining if the first data packet is a next expected date packet, storing the first data patent if the first data packet is the next expected data packet and waiting a period of time for a second data packet. These and other aspects and advantages will become apparent upon reading the following detailed description in combination with the accompanying drawings.

Figure 1:
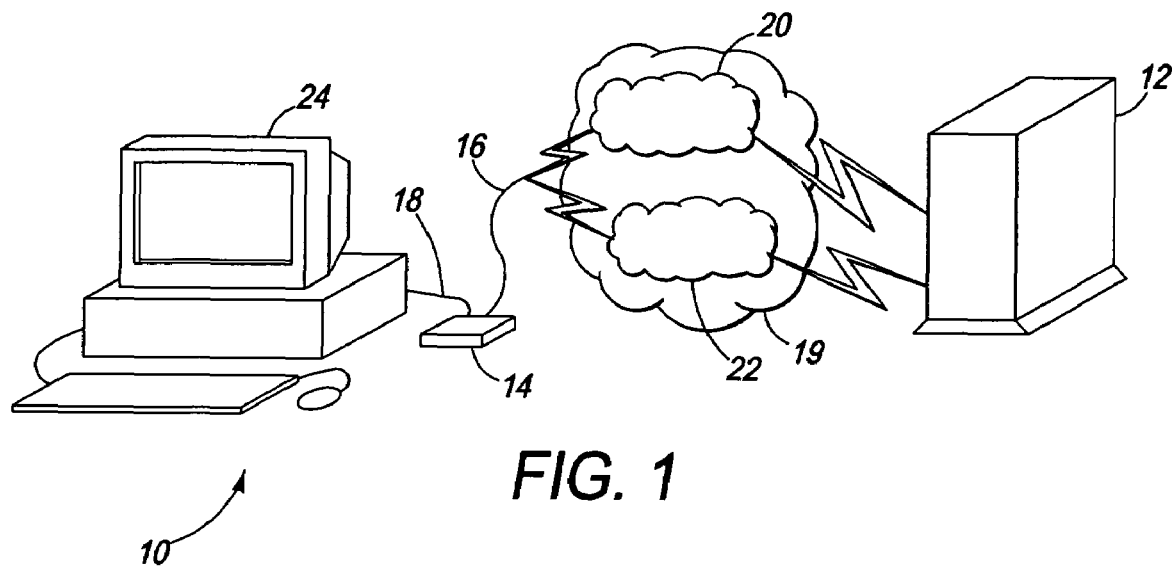
FIG. 1 is a block diagram of Internet protocol multi routing with packet interleaving system embodying the principles of the present invention.

Referring to FIG. 1, a system 10 for processing data packets is shown. The system 10 includes a primary router 12 and a customer router 14. The customer router 14 includes a network interface 16 and a device interface 18. The network interface 16 is connected to the primary server 12 by a network 19 having a first communication path 20 and a second communication path 22. The first and second communication paths 20, 22 may be a local area network, or a wide area network such as the Internet.

Connected to the device interface 18 is a client device 24. The client device 24 may be a general purpose computer or may be a dedicated device, such as a VoIP telephone. When connected, as shown in FIG. 1, the primary server 12 can communicate to the customer device 24 by transmitting a stream of data packets through two or more communication paths 20, 22 to the customer router and finally to the customer device 24.

Figure 2:
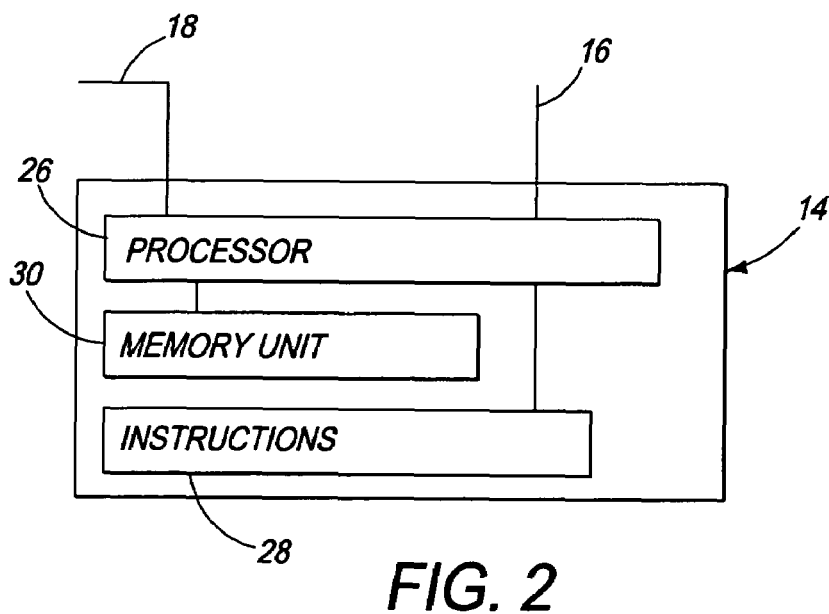
FIG. 2 is a block diagram of a customer router embodying the principles of the present invention.

Referring to FIG. 2, a more detailed illustration of the customer router 14 is shown. As stated previously, the customer router 14 includes a network interface 16 and a device interface 18. The customer router 14 includes a processor 26. The processor 26 is in communication with the network interface 16 and the device interface 18. Executable instructions 28 are in communication with the processor 26. The instructions 28 may be embedded within the processor 26 or may be stored within a device for storing processor executable instructions such as solid state memory, a magnetic storage device, an optical storage device or any other suitable device capable of storing processor executable instructions. Also in communication with the processor 26 is a memory unit 30. The memory unit 30 may be incorporated within the processor or may be a solid state memory, a magnetic storage device, an optical storage device or any device suitable for storing information utilized or created by the processor 26.

Referring to FIGS. 1 and 2, the primary server 12 will send data packets to the customer router 14 via the first communication path 20. The primary router 12 will also send identical data packets to the customer router 14 via the second communication path 22. This may be accomplished by having two different routing tables within the primary server 12. The routing tables provide the routing path for the first and second communication paths 20, 22.

By providing duplicate data packets on two different communication paths, the customer router 14 will be provided with an increased availability of data packets. Therefore, data packets that must be received sequentially and in a timely manner will have two communication paths on which to travel. If one of the communication paths is unable to deliver packets as timely as the other communication network, the customer router 14 will process packets received by the communication network providing the packets in the timeliest fashion. The customer router 14 will determine which packets from the communication paths to process in order to avoid processor inefficiencies.

Figure 3:
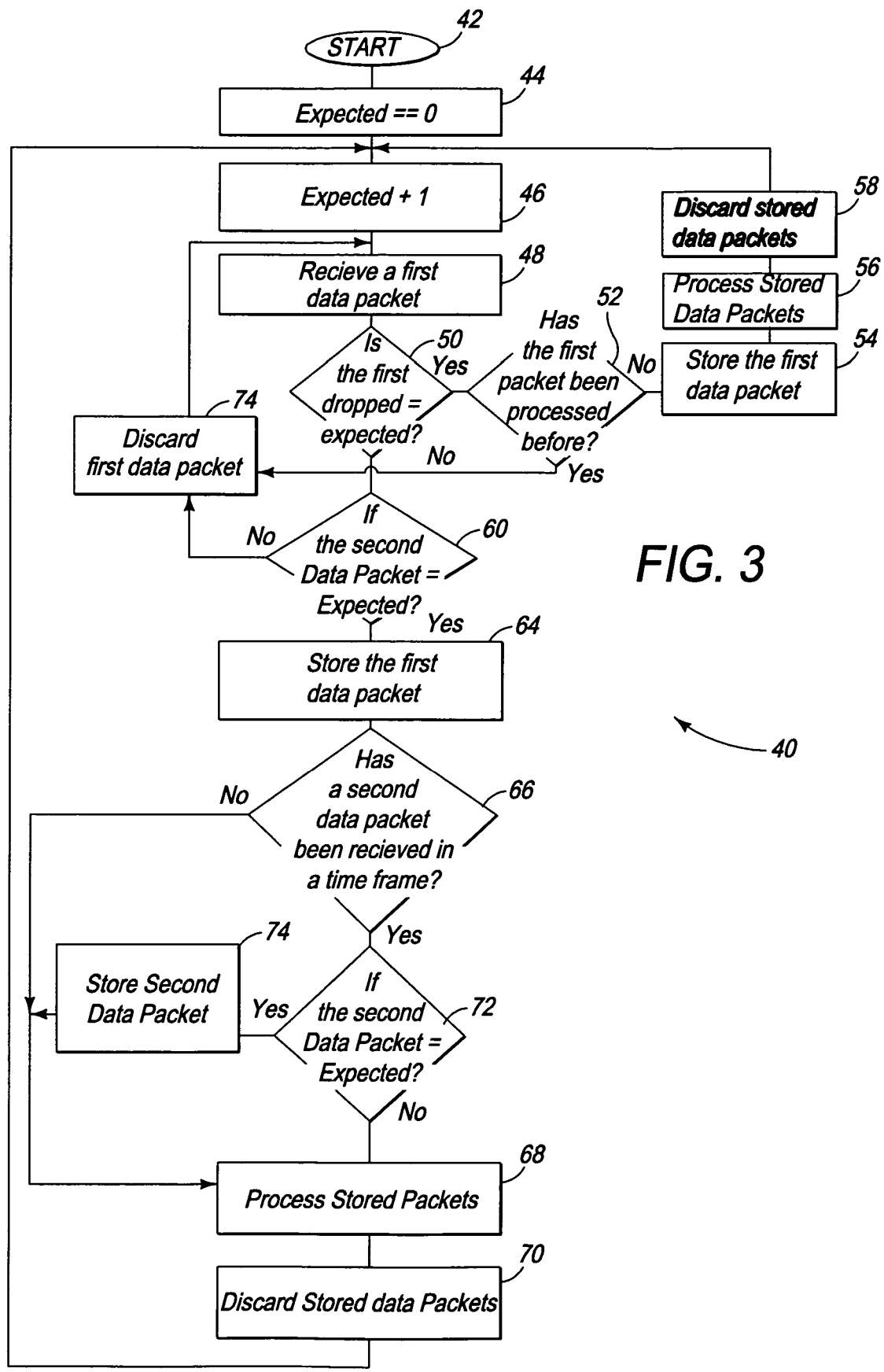
FIG. 3 is a block diagram of a flow chart illustrating one method the system may utilize embodying the principles of the present invention.

Referring to FIG. 3, a method 44 for processing the data packets received the customer router 14 by the processor 26 is shown. This method may be contained within the instructions 28 and may be executed by the processor 26. Block 42 denotes the start of the method. As shown in block 44, an expected data packet variable is set to zero. The expected data packet variable is representative of the data packet that the method is expecting to receive. The expected data packet variable may be a real-time transfer protocol ("RTP") data packet sequence number. By resetting the expected data packet variable to zero the method 40 will not inadvertently look for a data packet from a previous execution of the method 40. Thereafter, as shown in block 46 the expected data packet variable is set to represent the sequence number of the expected data packet.

In block 48, a first data packet will be received. In block 50, a determination is made if the first data packet is the expected data packet by comparing the sequence number of the first data packet to the sequence number of the expected data packet variable. If the first data packet is the expected data packet the method will continue to block 52. In block 52, the method determines if the first data packet has been processed before. If the first data packet has been received before, the first data packet will be discarded and the method will return to block 48. Otherwise, the first data packet will be stored, processed and discarded as shown in blocks 54, 56 and 58, respectively.

Returning to block 50, if the first data packet is not the expected data packet the method will continue to block 60. In block 60, a determination is made if the first data packet is the next expected data packet. The next expected data packet is the data packet to be processed after the expected data packet. It can be determined that the first data packet is the next expected data packet by comparing the sequence number of the first data packet to the sequence number of the next expected data packet variable. If the first data packet is not the next expected data packet, the method, as shown in block 62, discards the first data packet and returns to block 48. Otherwise, the method continues to block 64, where the first data packet is stored.

After block 64, the method proceeds to block 66 where a determination is made if a second data packet has been received within a specific period of time. The specific period of time may be about 30 milliseconds. If a second data packet is not received within the specific period of time, the method processes and discards the stored data packets (in this case the first data packet) as shown in blocks 68, 70, respectively. Thereafter, the method returns to block 46.

If a second data packet is received within the specific period of time, the method, as shown in block 72 determines if the second data packet is the expected data packet. If the second data packet is the expected data packet, the method, as shown in block 74, stores the second data packet. Afterwards, the method, as shown in blocks 68, 70, processes and discards the stored data packets (in this case the first and second data packets). Thereafter, the method returns to block 46.

If the second data packet is not the expected data packet, the method, as shown in blocks 68, 70, processes and discards the stored data packets (in this case the second data packet). Thereafter, the method returns to block 46.

Figure 4:
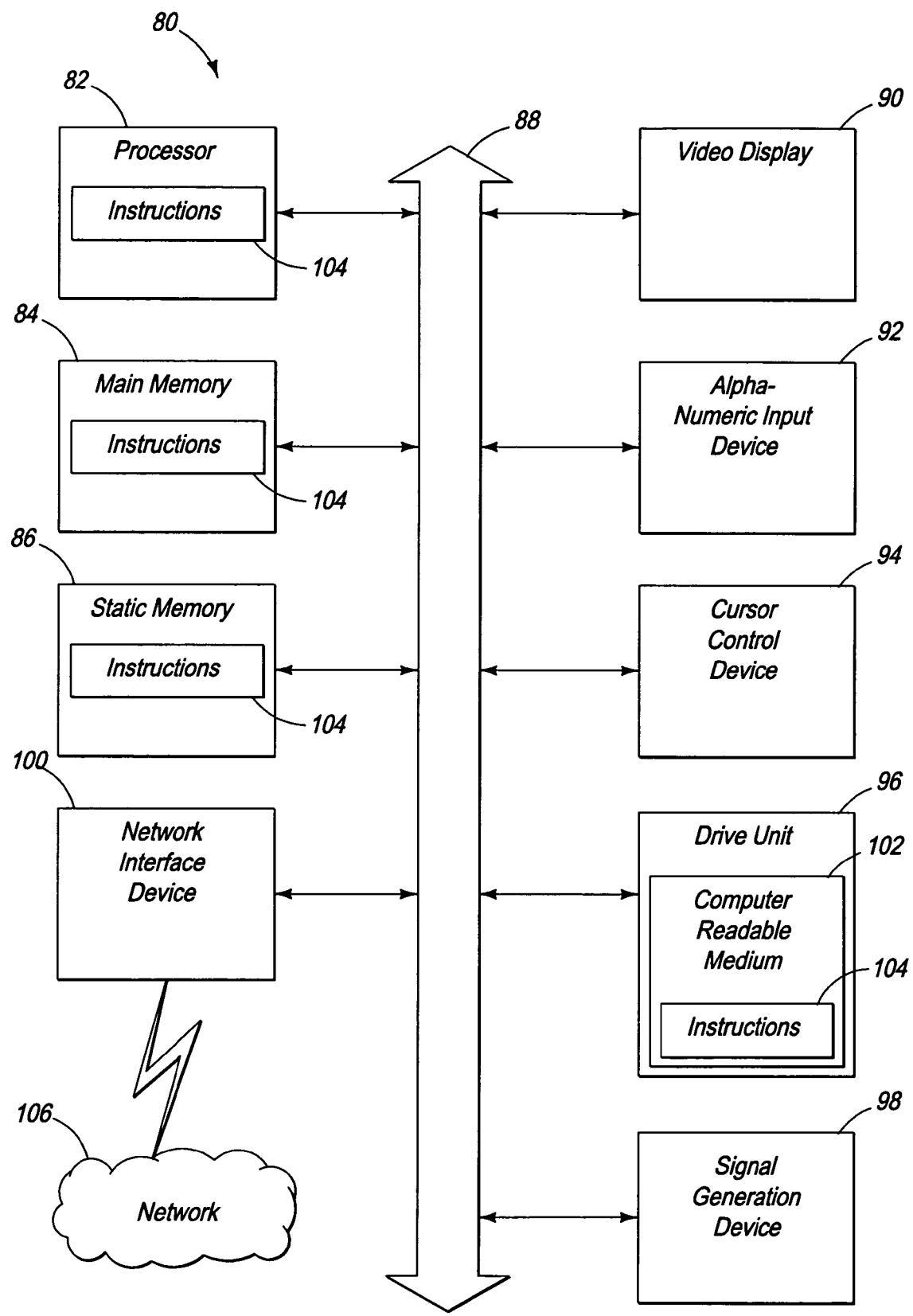
FIG. 4 is a block diagram of a general purpose computer embodying the principles of the present invention.

Referring to FIG. 4, an illustrative embodiment of a general computer system is shown and is designated 80. The computer system 80 can include a set of instructions that can be executed to cause the computer system 80 to perform any one or more of the methods or computer based functions disclosed herein. The computer system may be the router 14 or may be the computer 24 configured to mimic the operations of the router 14. The computer system 80 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 80 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 80 can be implemented using electronic devices that provide voice, video or data communication. Further, while a single computer system 80 is illustrated, the term "system" shall also be taken to include any collection of systems or sub-systems that individually or jointly execute a set, or multiple sets, of instructions to perform one or more computer functions.

As illustrated in FIG. 4, the computer system 80 may include a processor 82, e.g., a central processing unit (CPU), a graphics processing unit (GPU), or both. Moreover, the computer system 80 can include a main memory 84 and a static memory 86 that can communicate with each other via a bus 88. As shown, the computer system 80 may further include a video display unit 90, such as a liquid crystal display (LCD), an organic light emitting diode (OLED), a flat panel display, a solid state display, or a cathode ray tube (CRT). Additionally, the computer system 80 may include an input device 92, such as a keyboard, and a cursor control device 94, such as a mouse. The computer system 80 can also include a disk drive unit 96, a signal generation device 98, such as a speaker or remote control, and a network interface device 100.

In a particular embodiment, as depicted in FIG. 4, the disk drive unit 96 may include a computer-readable medium 102 in which one or more sets of instructions 104, e.g. software, can be embedded. Further, the instructions 104 may embody one or more of the methods or logic as described herein. In a particular embodiment, the instructions 104 may reside completely, or at least partially, within the main memory 84, the static memory 86, and/or within the processor 82 during execution by the computer system 80. The main memory 84 and the processor 82 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 104 or receives and executes instructions 104 responsive to a propagated signal, so that a device connected to a network 106 can communicate voice, video or data over the network 106. Further, the instructions 104 may be transmitted or received over the network 106 via the network interface device 100. The network 106 may be the network 19 (FIG. 1).

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A method for processing data packets, the method comprising:
    receiving a first data packet from one of a first data stream and second data stream, the first and second data streams comprise a plurality of data packets, the plurality of data packets of the second data stream being a duplicate of the plurality of data packets of the first data stream;
    determining if the first data packet is a first expected data packet;
    determining if the first data packet is a next expected data packet;
    storing the first data packet in the memory unit if the first data packet is the next expected data packet;
    waiting a period of time for a second data packet from one of the first and second data streams;
    discarding the first data packet if the first data packet has been received before;
    storing the first data packet in a memory unit if the first data packet has not been received before; and
    processing the first data packet stored in the memory unit.

2. The method of claim 1, wherein determining if the first data packet is the first expected data packet further comprises the step of comparing a first data packet sequence number to a first expected data packet sequence number.

3. The method of claim 1, wherein determining if the first data packet has been processed before further comprises the step of comparing a first data packet sequence number to a processed data packet sequence number.

4. The method according to claim 1, further comprising the step of determining if the second data packet is the first expected data packet.

5. The method of claim 4, wherein determining if the second data packet is the first expected data packet further comprises the step of comparing a second data packet sequence number to a first expected data packet sequence number.

6. The method of claim 4, further comprising:
    storing the second data packet in the memory unit if the second data packet is the first expected data packet;
    processing the first and second data packet stored in the memory unit; and
    discarding the first and second data packet stored in the memory unit.

7. The method of claim 4, further comprising:
    processing the first data packet if the second data packet is not the first expected data packet; and
    discarding the first data packet stored in the memory unit.

8. A method for processing data packets, the method comprising:
    receiving a first data packet from one of a first data stream and second data stream, the first and second data streams comprise a plurality of data packets, the plurality of data packets of the second data stream being a duplicate of the plurality of data packets of the first data stream;

determining if the first data packet is a first expected data packet;
determining if the first data packet is a next expected data packet;
storing the first data packet in the memory unit if the first data packet is the next expected data packet;
waiting a period of time for a second data packet from one of the first and second data streams;
processing the first data packet if the second data packet is not received before the period of time expires; and
discarding the first data packet stored in the memory unit.

9. The method of claim 1, wherein the period of time is about 30 milliseconds.

10. A computer readable medium storing a computer program, the computer readable medium comprising:
a first code segment that receives a first data packet from one of a first data stream and second data stream, the first and second data streams comprise a plurality of data packets, the plurality of data packets of the second data stream being a duplicate of the plurality of data packets of the first data stream;
a second code segment that determines if the first data packet is a first expected data packet;
a third code segment that determines if the first data packet is a next expected data packet, stores the first data packet in the memory unit if the first data packet is the next expected data packet, and waits a period of time for a second data packet from the parallel streams;
a fourth code segment that discards the first data packet if the first data packet has been received before;
a fifth code segment that stores the first data packet in a memory unit if the first data packet has not been received before; and
a sixth code segment that processes the first data packet stored in the memory unit.

11. The computer readable medium of claim 10, wherein the third code segment determines if the first data packet is the first expected data packet by comparing a first data packet sequence number to a first expected data packet sequence number.

12. The computer readable medium according to claim 10, further comprising a seventh code segment that determines if the second data packet is the first expected data packet.

13. The computer readable medium of claim 12, wherein the seventh code segment determines if the second data packet is the first expected data packet by comparing a second data packet sequence number to a first expected data packet sequence number.

14. The computer readable medium of claim 12, further comprising an eighth code segment that stores the second data packet in the memory unit if the second data packet is the first expected data packet, processes the first and second data packet stored in the memory unit, and discards the first and second data packet stored in the memory unit.

15. The computer readable medium of claim 12, further comprising an eighth code segment that processes the first data packet if the second data packet is not the first expected data packet, and discards the first data packet stored in the memory unit.

16. A computer readable medium storing a computer program, the computer readable medium comprising:
a first code segment that receives a first data packet from one of a first data stream and second data stream, the first and second data streams comprise a plurality of data packets, the plurality of data packets of the second data stream being a duplicate of the plurality of data packets of the first data stream;
a second code segment that determines if the first data packet is a first expected data packet; and
a third code segment that determines if the first data packet is a next expected data packet, stores the first data packet in the memory unit if the first data packet is the next expected data packet, and waits a period of time for a second data packet from the parallel streams;
a fourth code segment that processes the first data packet if the second data packet is not received before the period of time expires, and discards the first data packet stored in the memory unit.

17. The computer readable medium of claim 16, wherein the period of time is about 30 milliseconds.

18. A system for processing data packets, the system comprising:
a processor connected to a network interface, the network interface configured to receive a first data packet from one of a first data stream and second data stream, the first and second data streams comprise a plurality of data packets, the plurality of data packets of the second data stream being a duplicate of the plurality of data packets of the first data stream;
a memory unit in communication with the processor;
an instruction storage device in communication with the processor, the storage device containing instructions configuring the processor to determine if the first data packet is a first expected data packet, determine if the first data packet is a next expected data packet, store the first data packet in the memory unit if the first data packet is the next expected data packet, and wait a period of time for a second data packet from one of the first and second data streams;
wherein the instructions configure the processor to:
discard the first data packet if the first data packet has been received before;
store the first data packet in a memory unit if the first data packet has not been received before; and
process the first data packet stored in the memory unit.

19. The system of claim 18, wherein the instructions configure the processor to determine if the first data packet is the first expected data packet by comparing a first data packet sequence number to a first expected data packet sequence number.

20. The system of claim 18, wherein instructions configure the processor to determine if the first data packet has been processed before by comparing a first data packet sequence number to a processed data packet sequence number.

21. The system according to claim 18, wherein the instructions configure the processor to determine if the second data packet is the first expected data packet.

22. The system of claim 21, wherein the instructions configure the processor to determine if the second data packet is the first expected data packet further by comparing a second data packet sequence number to a first expected data packet sequence number.

23. The system of claim 21, wherein the instructions configure the processor to:
store the second data packet in the memory unit if the second data packet is the first expected data packet;
process the first and second data packet stored in the memory unit; and
discard the first and second data packet stored in the memory unit.

24. The system of claim 21, wherein the instructions configure the processor to:
process the first data packet if the second data packet is not the first expected data packet; and discard the first data packet stored in the memory unit.

25. The system of claim 18, wherein the period of time is about 30 milliseconds.

26. A system for processing data packets, the system comprising:
- a processor connected to a network interface, the network interface configured to receive a first data packet from one of a first data stream and second data stream, the first and second data streams comprise a plurality of data packets, the plurality of data packets of the second data stream being a duplicate of the plurality of data packets of the first data stream;
- a memory unit in communication with the processor; and
- an instruction storage device in communication with the processor, the storage device containing instructions configuring the processor to determine if the first data packet is a first expected data packet, determine if the first data packet is a next expected data packet, store the first data packet in the memory unit if the first data packet is the next expected data packet, and wait a period of time for a second data packet from one of the first and second data streams;

wherein the instructions configure the processor to:

process the first data packet if the second data packet is not received before the period of time expires; and discard the first data packet stored in the memory unit.

* * * * *